United States Patent [19]
Tada

[11] Patent Number: 4,938,074
[45] Date of Patent: Jul. 3, 1990

[54] VORTEX FLOW METER
[75] Inventor: Yasuo Tada, Hyogo, Japan
[73] Assignee: Mitsubishi Denki Kabushiki Kaisha, Tokyo, Japan
[21] Appl. No.: 323,589
[22] Filed: Mar. 14, 1989
[30] Foreign Application Priority Data Mar. 17, 1988 [JP] Japan ............................ 63-36851[U]

[51] Int. Cl.⁵ ................................................ G01F 1/32
[52] U.S. Cl. ................................................ 73/861.22
[58] Field of Search ......................... 73/861.22, 861.24
[56] References Cited

FOREIGN PATENT DOCUMENTS 54-3725 2/1979 Japan .
60-47531 10/1985 Japan .
61-4808 2/1986 Japan .

Primary Examiner—Herbert Goldstein
Attorney, Agent, or Firm—Sughrue, Mion, Zinn, Macpeak & Seas

[57] ABSTRACT

A vortex flow meter comprises a first diaphragm which divides first and second pressure chambers from each other; a second diaphragm which divides third and fourth pressure chambers from each other and is disposed in such a manner that the direction in which the second diaphragm is movable is coincident with that in which the first diaphragm is movable, and that the direction is not coincident with that of the maximum component of an external force which acts on the diaphragms; first and second bridge circuits which make outputs in response to the action of the first and second diaphragms, respectively; and differential amplifiers which perform the differential amplification of the outputs from the first and second bridge circuits.

3 Claims, 4 Drawing Sheets

VORTEX FLOW METER

BACKGROUND OF THE INVENTION 1. (Field of the Invention)

The present device relates to a vortex flow meter in which diaphragms are disposed in such a manner that the direction in which the diaphragms are movable is not coincident with that of the maximum component of a vibratory force.

2. (Prior Art)

There are various kinds of vortex pressure detection systems. The Japanese patent application No. 36776/75 or the Japanese Utility Model patent application No. 3725/79 disclosed a vortex pressure detection system in which the pressure of vortices is transmitted to right and a left chambers divided from each other by a diaphragm to detect the difference in the pressure of the vortices.

In a conventional vortex pressure detection system of such kind, the sensitivity of a diaphragm needs to be made very high to detect the pressure of vortices in a range of very low flow rate. However, if the sensitivity is made very high, the diaphragm responds not only to the pressure of the vortices but also to an external force such as a vibratory force. This is a problem.

SUMMARY OF THE INVENTION

The present device was made in order to solve the problem discussed above.

Accordingly, it is an object of the present device to provide a vortex flow meter which can measure a very low flow rate with very small vortex pressure and is high in resistance to external vibration.

The vortex flow meter provided in accordance with the present device comprises a first diaphragm which divides first and second pressure chambers from each other; a second diaphragm which divides third and fourth pressure chambers from each other and is disposed in such a manner that the direction in which the second diaphragm is movable is coincident with that in which the first diaphragm is movable, and that the direction is not coincident with that of the maximum component of an external force which acts on the diaphragms; first and second bridge circuits which make outputs in response to the action of the first and second diaphragms, respectively; and differential amplifiers which perform the differential amplification of the outputs from the first and the second bridge circuits.

In the vortex flow meter, the first and second diaphragms cumulatively act to detect the pressure difference between the first and second pressure chambers and that between the third and fourth pressure chambers to detect the pressure of Kárman vortices. However, the first and second diaphragms differentially act against the external force. The direction in which the first and second diaphragms are movable are not coincident with that of the maximum component of the external force which acts on the diaphragms. The outputs made by the first and second bridge circuits in response to the action of the first and second diaphragms, respectively, are differentially amplified by the differential amplifiers so that the vortex flow meter makes an output.

DETAILED DESCRIPTION OF THE PREFERRED EMBODIMENTS

An embodiment of the present device will be hereafter described with reference to the drawings attached hereto.

Figure 1:
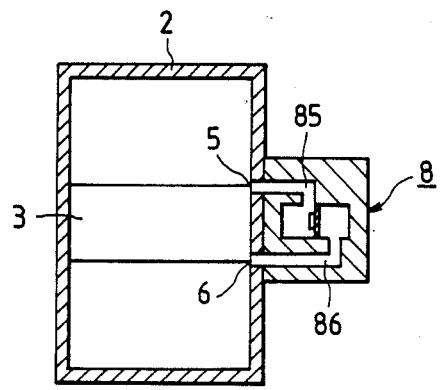
FIG. 1 a sectional view of a vortex flow meter which is an embodiment of the present device.
Figure 2:
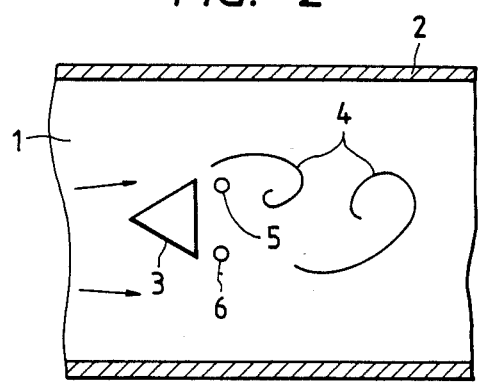
FIG. 2 shows a sectional view of the vortex generating section of the vortex flow meter.

FIG. 1 shows a sectional view of a vortex flow meter which is the embodiment. FIG. 2 shows a sectional view of the vortex generating section of the vortex flow meter. A fluid 1 to be measured flows through a conduit 2. A vortex generator 3 is provided in the conduit 2 and extends perpendicularly to the direction of the flow of the fluid 1 so that Kárman vortices 4 are generated downstream of vortex generator. The pressure of the Kárman vortices 4 is detected through pressure takeout ports 5 and 6 provided in the wall of the conduit 2. A vortex pressure detector 8 communicates with the pressure takeout ports 5 and 6.

Figure 3:
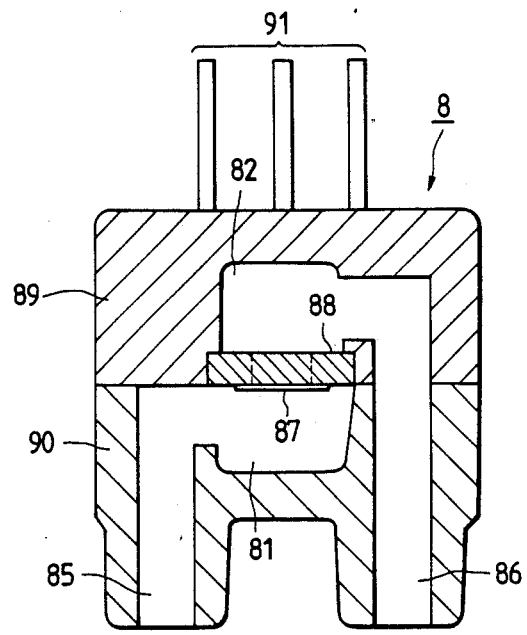
FIGS. 3 and 4 show mutually perpendicular sectional views of the vortex pressure detector of the vortex flow meter.
Figure 4:
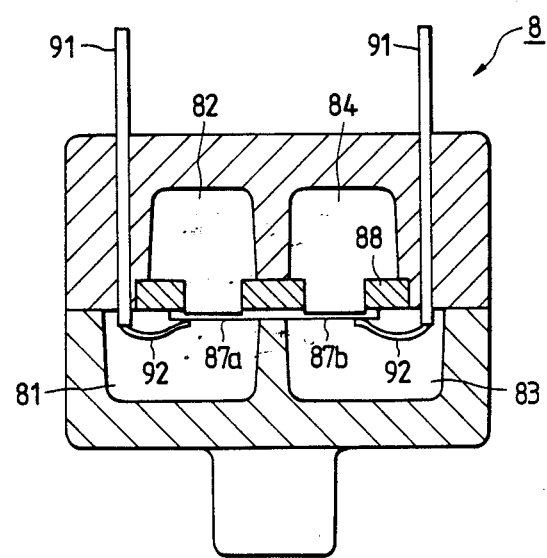

FIGS. 3 and 4 show mutually-perpendicular enlarged sectional views of the vortex pressure detector 8. Pressure passages 85 and 86 communicate with the pressure takeout ports 5 and 6. Pressure chambers 81, 82, 83 and 84 are provided in the vortex pressure detector 8 in such a manner that the first pressure chamber 81 and the fourth pressure chamber 84 communicate with the pressure passage 85, and the second pressure chamber 82 and the third pressure chamber 83 communicate with the other pressure passage 86. A base plate 88 is provided between the first and second pressure chambers 81 and 82 and between the third and fourth pressure chambers 83 and 84 and held between casing members 89 and 90. A semiconductor chip 87 is provided on the base plate 88 and has first and second diaphragms 87a and 87b. The first diaphragm 87a divides the first and second pressure chambers 81 and 82 from each other. The second diaphragm 87b divides the third and fourth pressure chambers 83 and 84 from each other. The casing members 89 and 90 define the pressure passages 85 and 86 and the pressure chambers 81, 82, 83 and 84, and hold the base plate 88. Terminals 91 are connected to wires 92 connected to the terminals of semiconductor bridge circuits 101 and 102 provided on the surfaces of the first and second diaphragms 87a and 87b but not shown in FIGS. 3 and 4.

Figure 5:
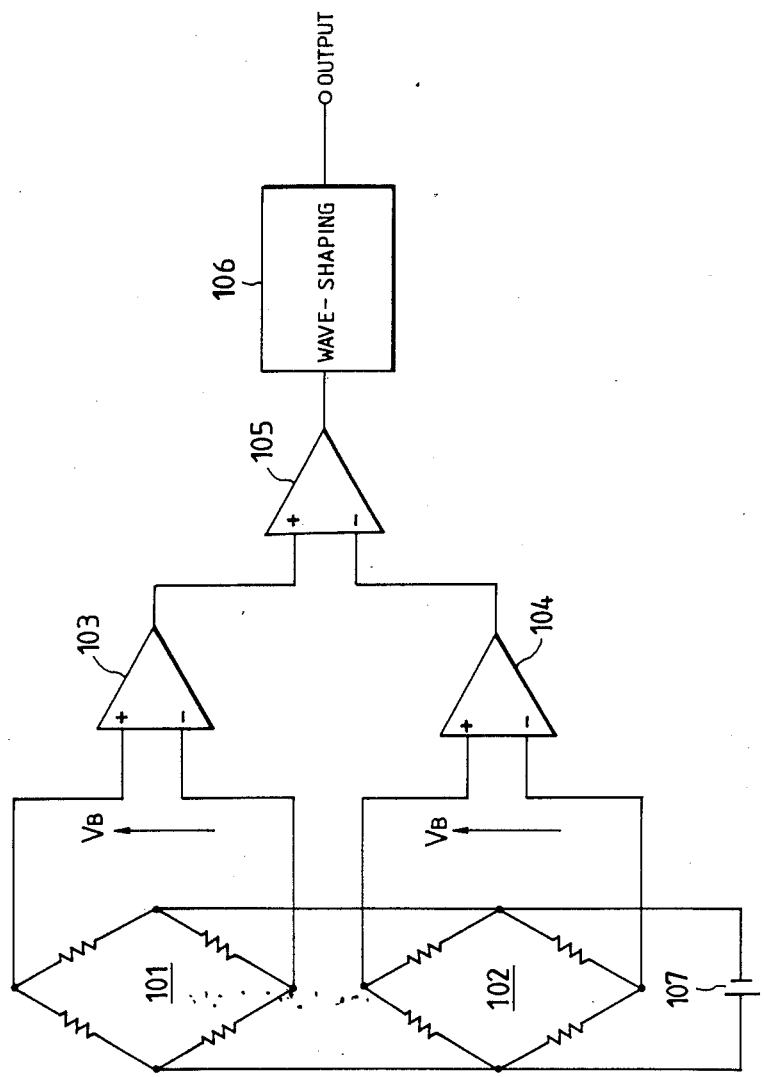
FIG. 5 shows a wiring diagram of the control section of the vortex flow meter.

FIG. 5 shows a wiring diagram of the control section of the vortex flow meter. Each of the first and second bridge circuits 101 and 102 is composed of four piezoelectric resistors. The output from the first bridge circuit 101 is applied to the plus and minus input terminals of a first differential amplifier 103. The output from the second bridge circuit 102 is applied to the plus and minus input terminals of a second differential amplifier 104. The outputs from the first and second differential amplifiers 103 and 104 are applied to the plus and minus input terminals of a third differential amplifier 105, the output from which is applied to a wave-shaping circuit 106 which shapes the output and provides the output from the vortex flow meter. A power supply 107 is provided for the first and second bridge circuits 101 and 102.

Figure 6:
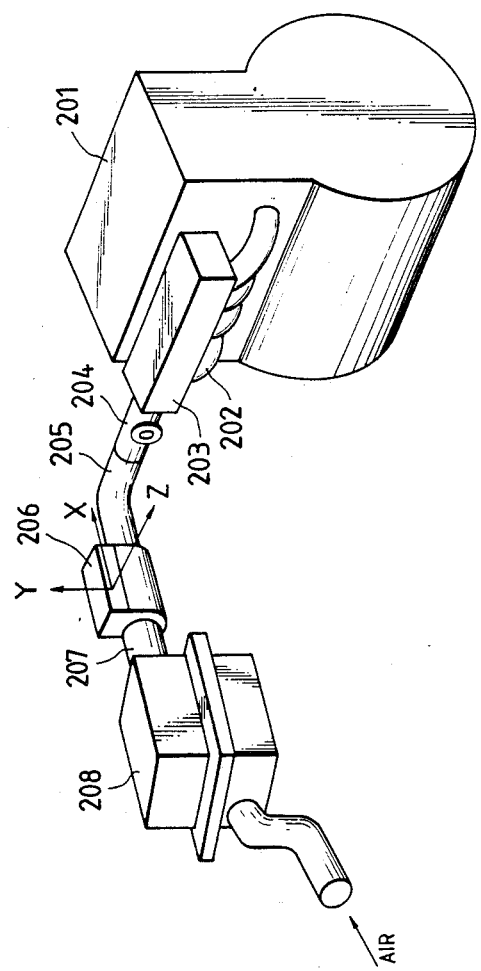
FIG. 6 shows an example of the use of the vortex flow meter, which the meter is installed in a motor vehicle.

FIG. 6 shows an example of the use of the vortex flow meter, in which the meter 206 is installed in a motor vehicle including an engine 201, an intake manifold 202, a surge tank 203, a throttle valve casing 204, a pipe 205 coupling the flow meter to the throttle valve casing, and another pipe 207 coupling an air cleaner 208 to the flow meter.

The operation of the vortex flow meter will now be described in detail. When the fluid 1 flows through the conduit 2, the clockwise and counterclockwise vortices 4 are alternately generated downstream of the vortex generator 3, as shown in FIG. 2. The vortices 4 are generally called the Kármán trail. The generation of the Kármán vortices 4 is accompanied by pressure changes. For that reason, pressure changes are caused on the inside surface of the conduit 2 along the passage for the Kármán vortices 4 so that some of the pressure changes alternately take place at the pressure takeout ports 5 and 6 provided in the conduit 2 in the face of the passage for the vortices. The pressure of the vortices 4 is negative in general. When the clockwise vortex 4 is generated at the pressure takeout port 5, negative pressure is caused at the port and transmitted to the first and fourth pressure chambers 81 and 84 through the pressure passage 85 so that the first and second diaphragms 87a and 87b deformed toward the first and fourth pressure chambers, respectively. When the counterclockwise vortex 4 is generated at the other pressure takeout port 6, negative pressure is caused at the port and transmitted to the second and third pressure chambers 82 and 83 through the other pressure passage 86 so that the first and second diaphragms 87a and 87b are deformed toward the second and third pressure chambers, respectively. It is herein supposed that when the first and second diaphragms 87a and 87bare deformed toward the first and the third pressure chambers 81 and 83, respectively, the outputs from the first and second bridge circuits 101 and 102 have such polarity as shown by arrows $v_B$ in FIG. 5. For that reason, at the time of the generation of the clockwise vortex 4, the first bridge circuit 101 makes the output $v_B$ and the second bridge circuit 102 makes the output $-v_B$. At the time of the generation of the counterclockwise vortex 4, the first bridge circuit 101 makes the output $-v_B$ and the second bridge circuit 102 makes the output $v_B$. The outputs from the first and second bridge circuits 101 and 102 are amplified by the first and second differential amplifiers 103 and 104 at prescribed amplification factors, respectively, so that the amplifiers make outputs $V_B$ and $-V_B$ which are applied to the third differential amplifier 105. When the outputs $V_B$ and $-V_B$ are applied to the plus and minus input terminals of the third differential amplifier 105, respectively, the amplifier makes an output $2V_B$. When the outputs $-V_B$ and $V_B$ are applied to the plus and minus input terminals of the third differential amplifier 105, respectively, the amplifier makes the same output $2V_B$. For these reasons, the first and second diaphragms 87a and 87b cumulatively act for the pressure of the vortices 4 so that the pressure can be detected even if it is very small.

The operation of the vortex flow meter in the case that external pressure except the pressure of the vortices 4 acts on the first and second diaphragms 87a and 87b is now described. For example, the external pressure is the pressure which fluctuates in a pulsation which takes place in the conduit 2 due to the change in the flow of the fluid 1. Since the pulsation propagates throughout a relatively large length to the location of the vortex generator 3 from upstream or downstream thereto, the pulsation is a kind of a completely plane traveling wave in the conduit 2. For that reason, pressure changes of the same quantity simultaneously take place at the pressure takeout ports 5 and 6 and are transmitted to the first and fourth pressure chambers 81 and 84 through the pressure passage 85 and to the second and third pressure chambers 82 and 83 through the pressure passage 86. Since the pressure changes of the same quantity are simultaneously transmitted to the first and second pressure chambers 81 and 82, the first diaphragm 87a is not deformed toward any of the chambers, so that the first bridge circuit 101 does not make any output from the pressure changes. As a result, the control section of the vortex flow meter does not make any output from the pressure changes. Since the pressure changes of the same quantity are simultaneously transmitted to the third and fourth pressure chambers 83 and 84, the second diaphragm 87b is not deformed toward any of the chambers, so that the second bridge circuit 102 does not make any output from the pressure changes. As a result, the control section does not make any output from the pressure changes.

The operation of the vortex flow meter in the case that the vortex pressure detector 8 is vibrated will now be described. When the detector 8 is vibrated in such a direction that the first and second diaphragms 87a and 87b are undeformable, the diaphragms are not deformed by the vibration, so that the control section does not make any output from the vibration. When the detector 8 is vibrated in such a direction that the diaphragms 87a and 87b are deformable, the diaphragms are deformed by the same quantity in the same direction at the same time due to the vibration so that the first and second bridge circuits 101 and 102 make the outputs $v_B$ from the vibration. In that case, the outputs $v_B$ are amplified by the first and second differential amplifiers 103 and 104 at the prescribed amplification factors so that the amplifiers make the outputs $V_B$ which are applied to the third differential amplifier 105 which generates an output indicative of the period of a pulsation. Since the outputs $V_B$ equal to each other are applied to the plus and minus input terminals of the third differential amplifier 105 in that case, the amplifier does not make any output from the vibration.

It is difficult to completely equalize the properties of the first and second diaphragms 87a and 87b to each other in manufacturing them. If a strong vibratory force acts to the first and second diaphragms 87a and 87b slightly different from each other in mass or piezoelectric constant, a non-negligible noise is caused in the output from the third differential amplifier 105. If the vibratory force is not strong, the noise is negligible.

Air needed by the engine 201 shown in FIG. 6 flows to the vortex flow meter 206 through the air cleaner 208 and the pipe 207 and is measured by the meter. The air then flows to the surge tank 203 through the pipe 205 and the throttle valve casing 204 and is entered into the cylinder of the engine 201 through the intake manifold 202. A vibratory force, which acts to the vortex flow meter 206 in this example of the use thereof, consists of components in mutually perpendicular directions X, Y and Z. The components are generally unequal to each other. In this example, the component in the direction Y is the strongest and that in the direction X is the weakest. Therefore, if the direction in which the first and second diaphragms 87a and 87b are deformable is made uncoincident with the direction Y or possibly made coincident with the direction X, the force which acts on the diaphragms in the direction in which the diaphragms are deformable can be made so weak that the noise caused in the output from the third differential amplifier 105 is negligible although the properties of the diaphragms are not completely equal to each other.

According to the present device, the first and second pressure chambers of the vortex pressure detector of a vortex flow meter are divided by a first diaphragm, and the third and fourth pressure chambers of the detector are divided by a second diaphragm, so that the diaphragms cumulatively act for the detection of the pressure of Kármán vortices but differentially act against an external force such as a vibratory force. Besides, the direction of the maximum component of the external force is made uncoincident with that in which the diaphragms are deformable. As a result, the meter's capability to detect the pressure of the Kármán vortices in a range of very low flow rate is enhanced, and the meter's resistance to the external force is made very high.

I claim:

1. A vortex flow meter, comprising:
   vortex generator means provided in a conduit through which a fluid to be measured flows for generating Kármán vortices;
   first pressure chamber;
   second pressure chamber;
   third pressure chamber;
   fourth pressure chamber;
   first and second pressure takeout ports for taking out the pressure of said vortices;
   a first pressure passage for transmitting the pressure change caused at said first pressure takeout port to said first and second pressure chambers;
   a second pressure passage for transmitting the pressure change caused at said second pressure takeout port to said second and third pressure chambers;
   a first diaphragm provided between said first and second pressure chamber for acting in response to the pressure difference between said first and second pressure chambers;
   a second diaphragm provided between said third and fourth pressure chambers for acting in response to the pressure difference between said third and fourth pressure chambers, said second diaphragm being movable in a first direction coincident with that in which said first diaphragm is movable, said first direction is not coincident with a second direction of a maximum component of an external force which acts to said first and second diaphragms;
   first and second bridge circuits provided on said first and second diaphragms, respectively, for generating a pair of outputs inverse to each other in polarity and equal to each other in absolute value in response to the action of said first and second diaphragms, respectively; and
   differential amplifying means for differentially amplifying the outputs from said first and second bridge circuits to generate an output indicative of the period of a pulsation.

2. A vortex flow meter as claimed in claim 1, wherein said differential amplifying means comprising first and second differential amplifiers for differentially amplifying said pair of outputs from said first and second bridge circuits, respectively, and a third differential amplifier for differentially amplifying the outputs from said first and second amplifiers.

3. A vortex flow meter as claimed in claim 2, further comprising a wave-shaping circuit for wave-shaping the output from said third differential amplifier.

* * * * *